United States Patent
Yeo

(10) Patent No.: US 7,843,660 B1
(45) Date of Patent: Nov. 30, 2010

(54) DISK DRIVE ADJUSTING ERASURE WINDOW BASED ON A NUMBER OF NON-READ DATA SECTORS DURING A RETRY OPERATION

(75) Inventor: Teik Ee Yeo, Trabuco Canyon, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 192 days.

(21) Appl. No.: 12/277,587

(22) Filed: Nov. 25, 2008

(51) Int. Cl.
*G11B 27/36* (2006.01)

(52) U.S. Cl. .......................... 360/53; 360/31; 714/769; 714/774

(58) Field of Classification Search ....................... None
See application file for complete search history.

(56) References Cited

U.S. PATENT DOCUMENTS

| | | | |
|---|---|---|---|
| 5,689,727 A | 11/1997 | Bonke et al. | |
| 5,721,816 A | 2/1998 | Kusbel et al. | |
| 5,909,334 A | 6/1999 | Barr et al. | |
| 6,119,261 A * | 9/2000 | Dang et al. | 714/769 |
| 6,122,235 A | 9/2000 | Arai | |
| 6,317,850 B1 | 11/2001 | Rothberg | |
| 6,405,342 B1 | 6/2002 | Lee | |
| 6,751,037 B1 * | 6/2004 | Haines et al. | 360/51 |
| 6,920,005 B2 | 7/2005 | Yun | |
| 7,002,765 B2 | 2/2006 | Lum et al. | |
| 7,136,244 B1 | 11/2006 | Rothberg | |
| 7,215,494 B2 | 5/2007 | Wang et al. | |
| 7,322,003 B2 | 1/2008 | Ishii | |
| 2002/0008928 A1 | 1/2002 | Takahashi | |
| 2007/0053094 A1 | 3/2007 | Kitamura et al. | |
| 2008/0072120 A1 * | 3/2008 | Radke | 714/768 |

\* cited by examiner

*Primary Examiner*—Jason C Olson

(57) ABSTRACT

A disk drive is disclosed comprising a disk having a plurality of data tracks, wherein each data track comprises a plurality of data sectors. A head is actuated radially over the disk in order to read one of the data sectors from a target data track on the disk. The data sector is stored in a buffer and decoded with an error correction code (ECC) decoder. When the decode fails, an erasure window is adjusted based on a number of non-read data sectors recorded in the target data track, wherein the erasure window comprises a length spanning at least one ECC symbol in the data sector. The data sector is read from the buffer and decoded with the ECC decoder using the erasure window.

20 Claims, 8 Drawing Sheets

DISK DRIVE ADJUSTING ERASURE WINDOW BASED ON A NUMBER OF NON-READ DATA SECTORS DURING A RETRY OPERATION

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric data tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a typical format of a disk 2 comprising a plurality of data tracks 4 defined by a plurality of embedded servo sectors $6_0$-$6_N$. Each servo sector 6, comprises a preamble 8 for storing a periodic pattern that enables proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Because the disk is rotated at a constant angular velocity, the data rate of the data sectors is typically increased toward the outer diameter data tracks (where the surface of the disk is spinning faster) in order to achieve a more constant linear bit density across the radius of the disk. To simplify design considerations, the data tracks are typically banded together into a number of physical zones (such as physical zones 1 through 3 shown in FIG. 1), wherein the data rate is constant across a zone, and increased from the inner diameter zones to the outer diameter zones. Since the data rate increases toward the outer diameter of the disk, the number of data sectors (or size of data sectors) per data track can be increased toward the outer diameter of the disk.

DETAILED DESCRIPTION OF EMBODIMENTS OF THE INVENTION

Figure 2A:
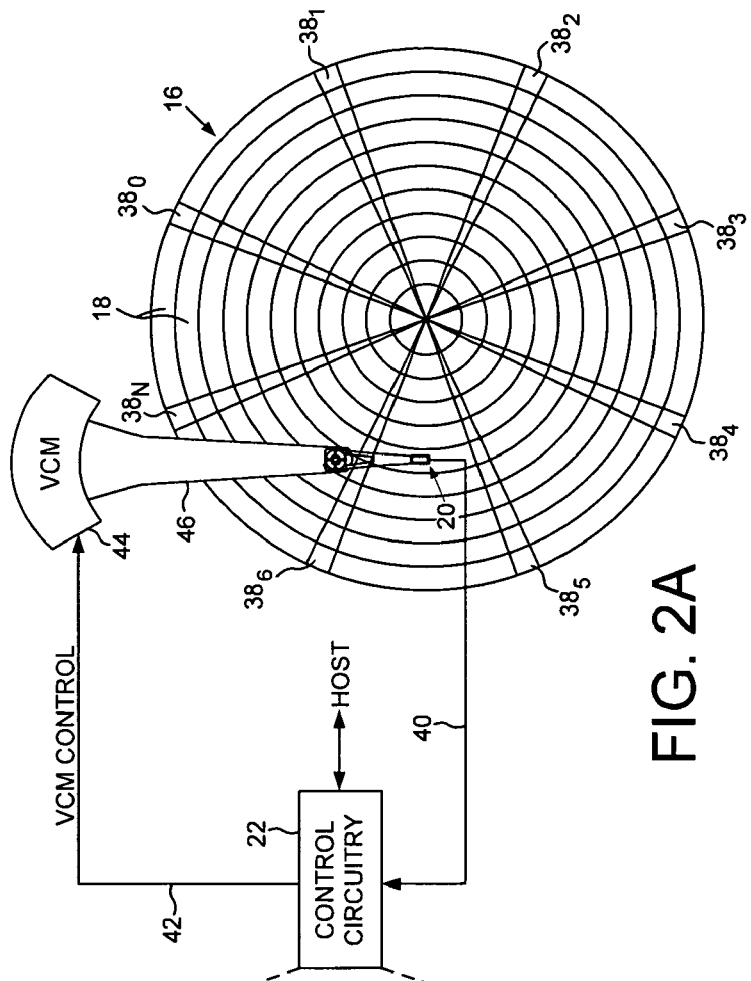
FIG. 2A shows a disk drive according to an embodiment of the present invention comprising a head actuated over a disk and control circuitry.

FIG. 2A shows a disk drive according to an embodiment of the present invention comprising a disk 16 having a plurality of data tracks 18, wherein each data track comprises a plurality of data sectors. The disk drive further comprises a head 20 actuated over the disk 16, and control circuitry 22 for executing the flow diagram of FIG. 2B during a retry operation. The head 20 is actuated radially over the disk 16 in order to read one of the data sectors from a target data track on the disk 16 (step 24). The data sector is stored in a buffer (step 26) and decoded with an error correction code (ECC) decoder (step 28). When the decode fails (step 30), an erasure window is adjusted based on a number of non-read data sectors recorded in the target data track (step 32), wherein the erasure window comprises a length spanning at least one ECC symbol in the data sector. The data sector is read from the buffer (step 34) and decoded with the ECC decoder using the erasure window (step 36).

In the embodiment of FIG. 2A, the data tracks 18 are defined by embedded servo sectors $38_0$-$38_N$ recorded around the circumference of the disk 16. The control circuitry 22 processes the read signal 40 emanating from the head 20 to demodulate the servo sectors $38_0$-$38_N$ into a position error signal (PES). The PES is filtered with a suitable compensation filter to generate a control signal 42 applied to a voice coil motor (VCM) 44 which rotates an actuator arm 46 about a pivot in order to position the head 20 radially over the disk 16 in a direction that reduces the PES. The servo sectors $38_0$-$38_N$ may comprise any suitable position information, such as a track address for coarse positioning and servo bursts for fine positioning.

Figure 1:
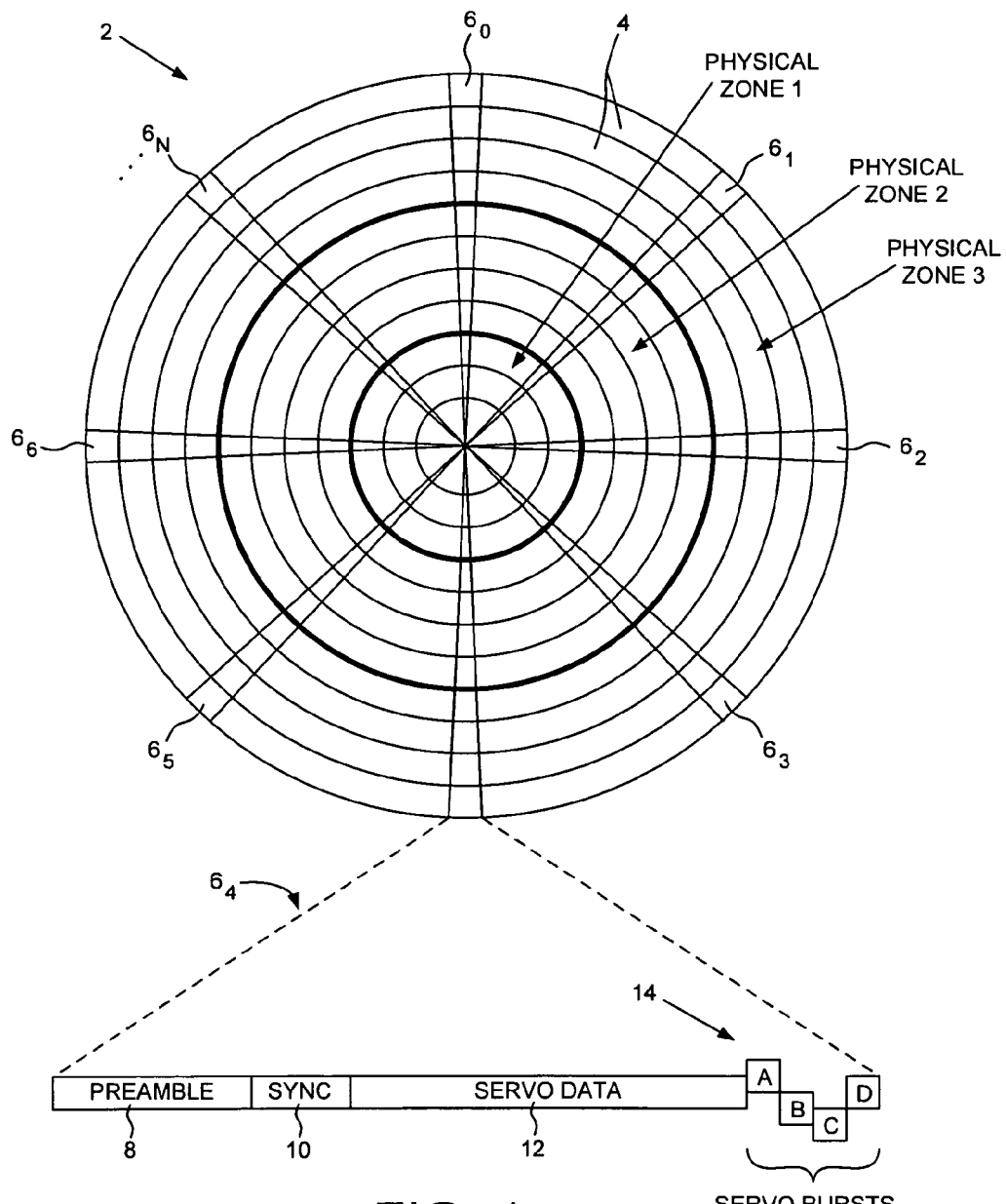
FIG. 1 shows a prior art disk format comprising servo sectors defining data tracks banded together to form a plurality of physical zones.

In one embodiment, the data rate of the data sectors is typically increased toward the outer diameter data tracks (where the surface of the disk is spinning faster) in order to achieve a more constant linear bit density across the radius of the disk. The data tracks are banded together into a number of physical zones (such as physical zones 1 through 3 shown in FIG. 1), wherein the data rate is constant across a zone, and increased from the inner diameter zones to the outer diameter zones. Since the data rate increases toward the outer diameter of the disk, the number of data sectors (or size of data sectors) per data track can be increased toward the outer diameter of the disk.

Figure 3A:
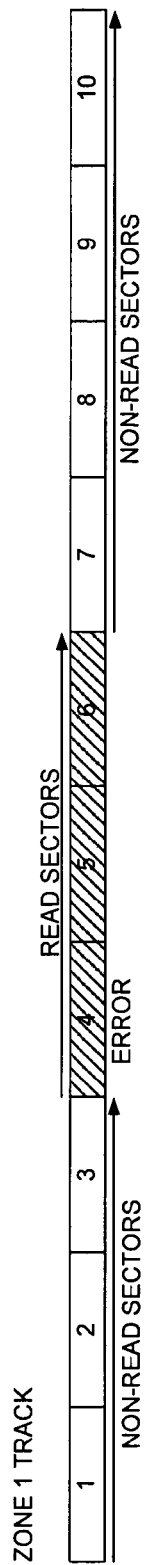
FIG. 3A shows an embodiment of the present invention wherein the erasure window is adjusted based on seven non-read data sectors of a data track in a first zone.
Figure 3B:
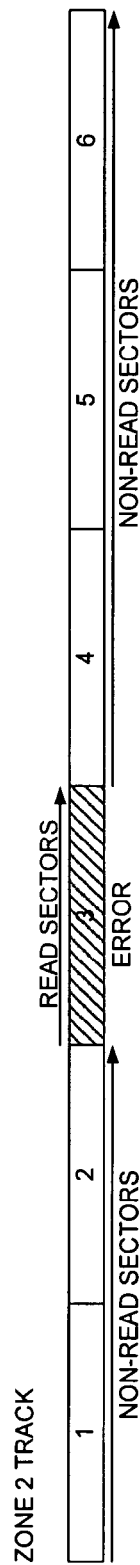
FIG. 3B shows an embodiment of the present invention wherein the erasure window is adjusted based on five non-read data sectors of a data track in a second zone.

FIGS. 3A and 3B illustrate non-read data sectors according to embodiments of the present invention. In the embodiment of FIG. 3A, data sectors are read from a target data track in a first physical zone having a data rate that enables the recording of 10 data sectors per data track. A read operation attempts to read sectors 4-6, wherein data sector 4 fails the initial ECC decoding. In this embodiment, the control circuitry continues the read operation and attempts to read data sectors 5-6 even though data sector 4 was initially unrecoverable. Data sector 4 is stored in a buffer, and after the control circuitry reads data sector 6, the control circuitry initiates a retry operation to attempt to reread data sector 4. While the disk is spinning the head passes over non-read data sectors 7-10 and then data sectors 1-3. As the head is passing over the non-read data sectors, the control circuitry repeatedly reads data sector 4 from the buffer and attempts to decode the data sector using the erasure window. In the embodiment of FIG. 3A, there are 7 non-read data sectors (7-10 and 1-3) and a corresponding number of clock cycles that may be used to decode data sector 4. In one embodiment, the erasure window is adjusted prior to the retry operation based on the number of non-read data sectors (7 in the example of FIG. 3A).

As described in greater detail below, in one embodiment the erasure window is adjusted so that it can be stepped across the entire data sector before the head reaches the data sector recorded in the target data track during the retry operation. As the number of non-read data sectors increases, the number of clock cycles for ECC decoding increases, and so the erasure window is adjusted in order to optimize its benefit. Referring again to FIG. 3A, if only one data sector is read during the read operation (data sector 4), the number of non-read data sectors increases to 9 and therefore the erasure window is adjusted in a manner that exploits the increased number of clock cycles for ECC decoding during the retry operation.

FIG. 3B shows an embodiment wherein a single data sector (data sector 3) is read from a target data track in a second physical zone having a data rate that enables the recording of 6 data sectors per data track. If an error occurs when reading data sector 3, the erasure window is adjusted relative to the 5 non-read data sectors and then used to decode data sector 3 from the buffer during the retry operation. This embodiment illustrates that the number of non-read data sectors may depend on the physical zone the target data track is located, and therefore in one embodiment the erasure window is adjusted based on the physical zone the target data track is located.

Figure 2B:
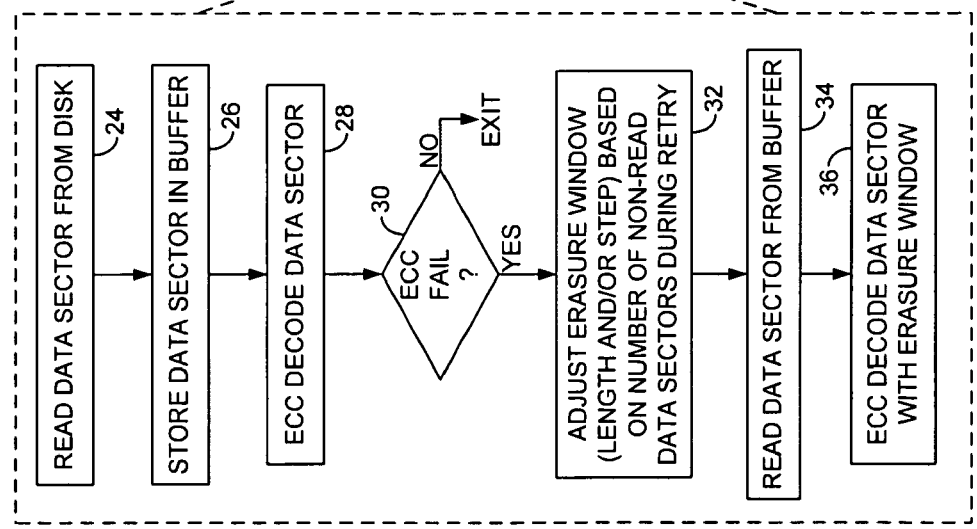
FIG. 2B is a flow diagram executed by the control circuitry according to an embodiment of the present invention wherein an erasure window used during a retry operation is adjusted based on a number of non-read data sectors in the data track.
Figure 4:
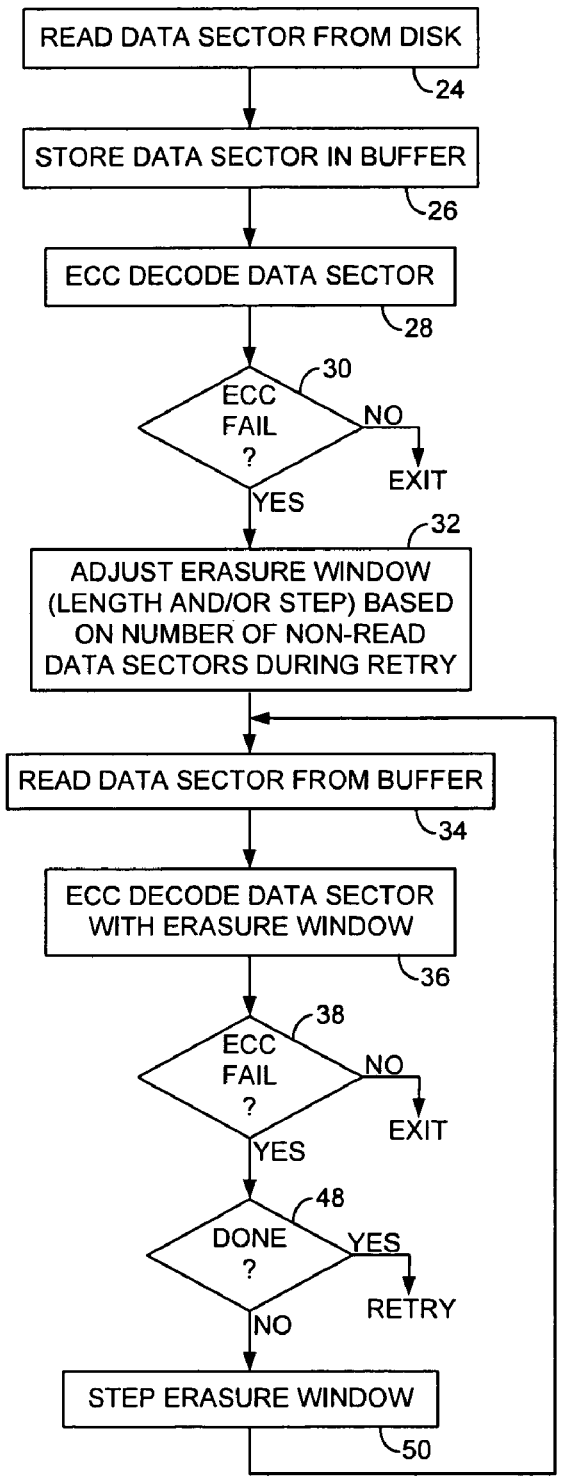
FIG. 4 is a flow diagram according to an embodiment of the present invention wherein the erasure window is stepped across the entire data sector during the retry operation.

FIG. 4 is a flow diagram according to an embodiment which expands on the flow diagram of FIG. 2B, wherein after reading the data sector from the buffer (step 34), it is ECC decoded (step 36). If the ECC decoding fails (step 38), the erasure window is stepped by a step size equal to at least one ECC symbol in the data sector (step 50). This process repeats until the erasure window is stepped across the entire data sector (step 48).

Figure 5A:
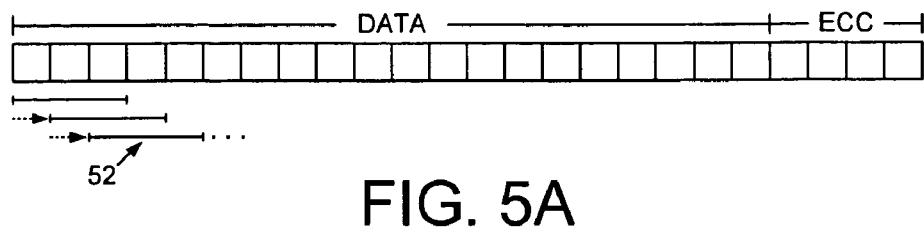
FIG. 5A shows an embodiment of the present invention wherein the erasure window is three ECC symbols long, and is stepped across the data sector with a step size of one ECC symbol.

FIG. 5A shows an example embodiment of a data sector comprising a number of ECC symbols (including data and redundancy symbols), wherein the erasure window 52 spans three ECC symbols. Any suitable error correction code capable of processing erasures may be employed in the embodiments of the present invention, such as a Reed-Solomon code which has a combined error and erasure correction capacity of $2t+s<=n-k$ (where t is the number of random errors, s is the number of erasures, and n−k is the number of ECC redundancy symbols in the data sector). Any suitable length may be selected for the erasure window 52, and the length may be adjusted during each retry operation in an attempt to recover the data sector using a different number of erasures.

In the embodiment of FIG. 5A, the erasure window 52 is stepped by a step size equal to one ECC symbol each time the ECC decoding fails (step 38 of FIG. 4). In one embodiment, the length of the erasure window and/or the step size is adjusted so that the erasure window is stepped across the entire data sector during the retry operation prior to the head reaching the data sector recorded in the target data track. As described above with reference to FIGS. 3A and 3B, the amount of ECC decoding time (number of ECC decoder clocks) available during the retry operation depends on the number of non-read data sectors.

Figure 5B:
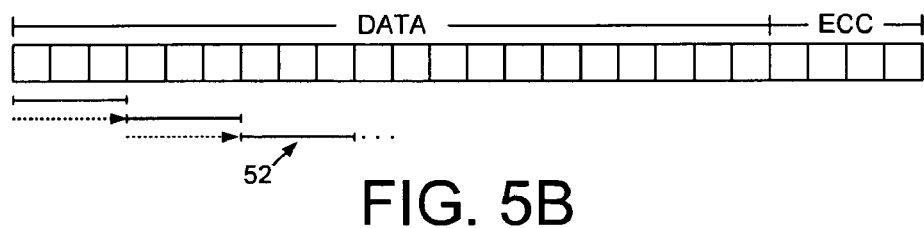
FIG. 5B shows an embodiment of the present invention wherein the step size is increased to three ECC symbols so that less steps are required to step the erasure window across the data sector.
Figure 5C:
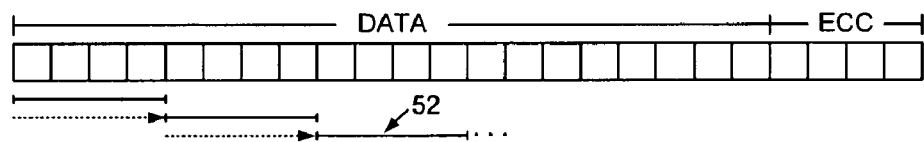
FIG. 5C shows an embodiment of the present invention wherein the length of the erasure window is increased to four ECC symbols so that less steps are required to step the erasure window across the data sector.

FIG. 5B shows an embodiment wherein the number of non-read data sectors is less than the example of FIG. 5A, and therefore the step size is increased to three ECC symbols. In this manner, the erasure window 52 is stepped across the data sector faster, but the larger step size increases the probability that the erasure window will step over a defect. FIG. 5C shows an alternative embodiment wherein the length of the erasure window 52 is increased so that the erasure window is stepped across the data sector faster, where the longer erasure window may increase or decrease the probability of recovering the data sector depending on the nature and number of defects in the data sector.

Figure 5D:
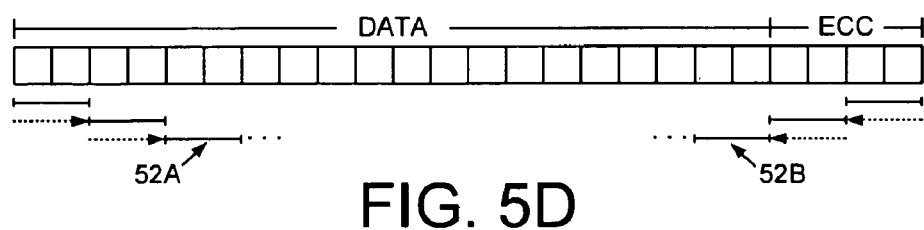
FIG. 5D shows an embodiment of the present invention wherein two erasure windows are stepped across the data sector (one from each end).

FIG. 5D illustrates an embodiment of the present invention wherein two erasure windows 52A and 52B are stepped across the data sector toward one another starting at both ends of the data sector. This embodiment may help recover the data sector by locating multiple defects using multiple erasure windows. In one embodiment, one or both of the erasure windows 52A and 52B are adjusted based on the number of non-read data sectors during the retry operation. In this manner, the erasure windows 52A and 52B reach one another in the middle of the data sector before the head reaches the data sector recorded in the target data track.

Figure 6A:
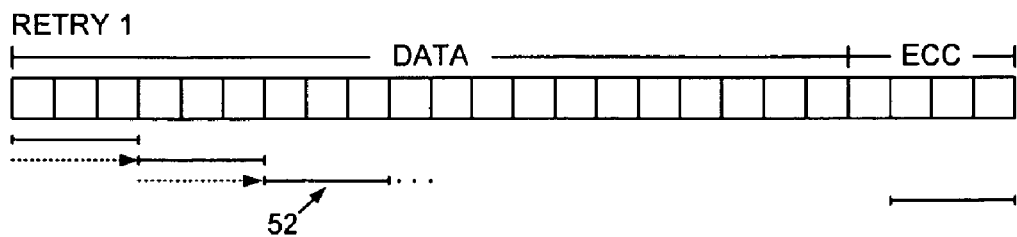
FIGS. 6A-6C show an embodiment of the present invention wherein a starting point of the erasure window is adjusted by an offset after each retry operation.
Figure 6B:
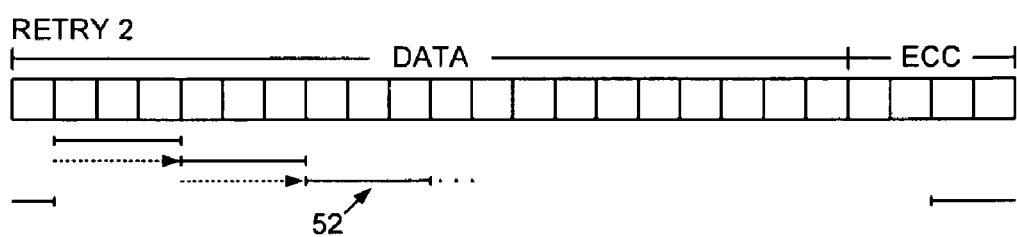
Figure 6C:
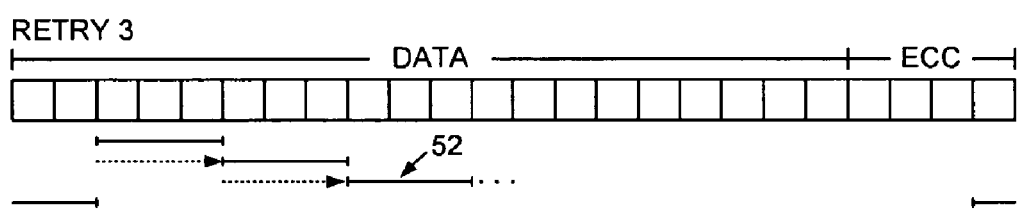

FIGS. 6A-6C illustrate an embodiment of the present invention wherein the erasure window 52 is stepped across the data sector starting at a different offset at the start of each retry operation. The offset is initialized (e.g., initialized to zero as shown in FIG. 6A), and the erasure window is stepped across the data sector using the step size during the first retry. After each retry operation, the offset is adjusted and the ECC iterations are re-executed starting from the new offset. In the example of FIG. 6B, the offset is adjusted (incremented) by one ECC symbol; however, the offset may be adjusted by any suitable number of ECC symbols. When the erasure window reaches the end of the data sector, the erasure window wraps around to the beginning of the data sector as illustrated in FIGS. 6B and 6C. This embodiment may increase the probability of recovering the data sector by adjusting the offset until the erasure window aligns with a defect in the data sector.

Figure 7:
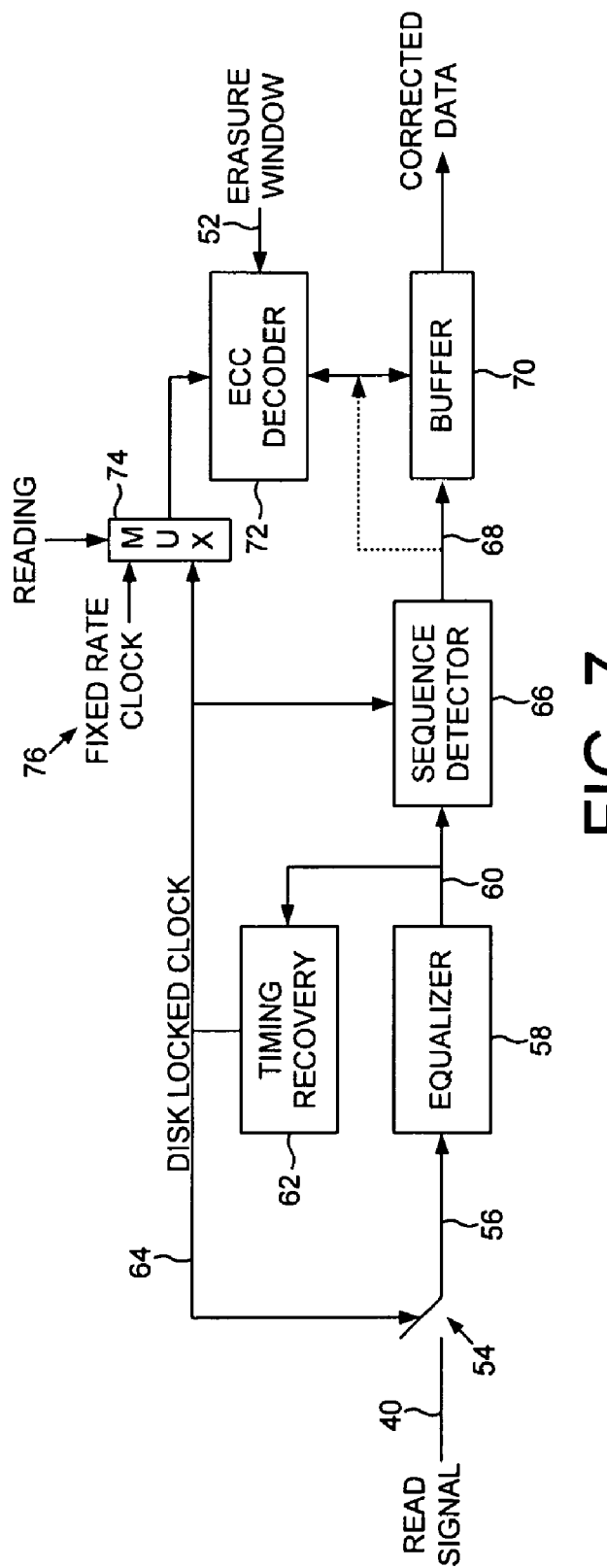
FIG. 7 shows control circuitry according to an embodiment of the present invention wherein the ECC decoder is clocked by a disk locked clock when reading data from the disk, and clocked by a high frequency fixed rate clock while attempting a retry without reading data from the disk.

FIG. 7 shows control circuitry according to an embodiment of the present invention, wherein the read signal 40 is sampled by a sampling device 54 (e.g., an A/D converter), and the signal samples 56 equalized by an equalizer 58 according to a suitable response (e.g., a suitable partial response such as PR4, ERP4, etc.). The equalized samples 60 are processed by timing recovery 62 which generates a disk locked clocked 64 synchronized to the data rate of the read signal 40. In the embodiment of FIG. 7, the disk locked clock 64 controls the sampling frequency of the sampling device 54 in order to synchronize the sampling device to the data rate of the read signal 40. A sequence detector 66 processes the equalized sample values 60 to detect an estimated data sequence 68 which is stored in a buffer 70. The estimated data sequence 68 is processed by an ECC decoder 72 (either at the output of the sequence detector 66 or read from the buffer 70) in order to ECC decode a data sector.

During the initial read operation, the disk locked clock 64 is applied to the ECC decoder 72 through multiplexer 74 so that the data sector is ECC decoded at the data rate of the read signal 40. During a retry operation while the head is passing over the non-read data sectors of the target data track, the multiplexer 74 is programmed to apply a fixed rate clock 76 to the ECC decoder 72 so that the data sector is ECC decoded using the erasure window 52 at the frequency of the fixed rate clock 76. In one embodiment, the frequency of the fixed rate clock 76 is selected as high as possible (e.g., corresponding to the physical zone having the highest data rate). In this manner, when the control circuitry is not reading data from the disk during a retry operation, the ECC decoder 72 can be clocked at a high rate. The higher rate ECC decoding enables a smaller length and/or step size for the erasure window 52 which may increase the probability of recovering the data sector during the retry operation.

Figure 8:
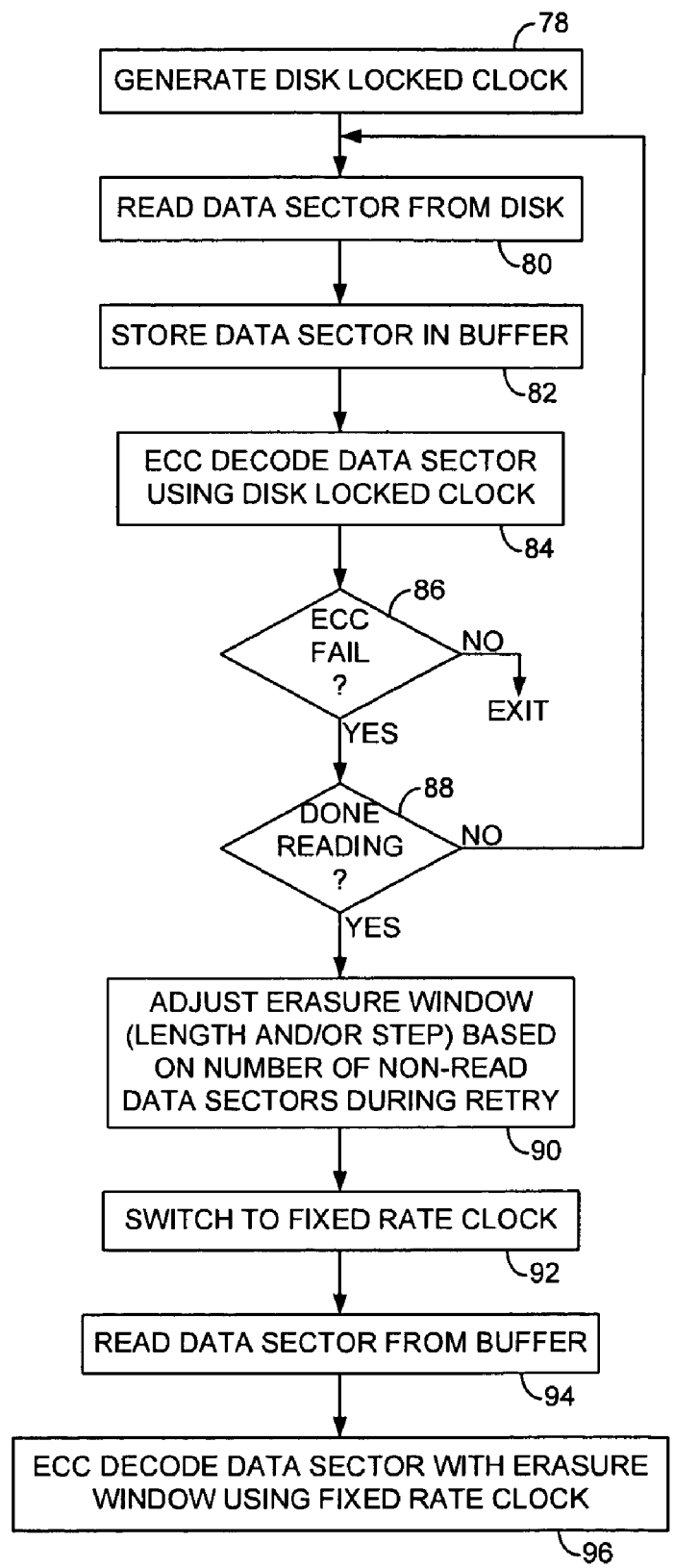
FIG. 8 is a flow diagram according to an embodiment of the present invention wherein during a retry operation the data sector is read from the buffer and decoded using the fixed rate clock.

FIG. 8 is a flow diagram according to an embodiment of the present invention. A disk locked clock is synchronized to a data rate of the data sector recorded in the target data track (step 78), such as the disk locked clock 64 disclosed above with reference to FIG. 7. The data sector is read from the disk (step 80) and stored in the buffer (step 82). The data sector is ECC decoded using the disk locked clock (step 84), and if the ECC decoding fails (step 86), and the control circuitry is not reading other data sectors (step 88), then the erasure window is adjusted based on the number of non-read data sectors in the target data track (step 90). The ECC decoding clock is switched to a fixed rate clock (step 92), the data sector is read from the buffer (step 94), and the data sector is ECC decoded with the erasure window using the fixed rate clock (step 96).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of data tracks, wherein each data track comprises a plurality of data sectors;
    a head actuated radially over the disk; and
    control circuitry operable to:
        read one of the data sectors from a target data track on the disk;
        store the data sector in a buffer;
        first decode the data sector with an error correction code (ECC) decoder;
        when the first decode fails:
            adjust an erasure window based on a number of non-read data sectors recorded in the target data track, wherein the erasure window comprises a length spanning at least one ECC symbol in the data sector;
            read the data sector from the buffer; and
            second decode the data sector with the ECC decoder using the erasure window.

2. The disk drive as recited in claim 1, wherein when the second decode fails the control circuitry is further operable to:
    step the erasure window by a step size equal to at least one ECC symbol in the data sector;
    read the data sector from the buffer; and
    third decode the data sector with the ECC decoder using the erasure window.

3. The disk drive as recited in claim 2, wherein adjusting the erasure window comprises adjusting at least one of the length of the erasure window and the step size.

4. The disk drive as recited in claim 2, wherein the control circuitry is further operable to repeatedly step the erasure window by the step size and decode the data sector using the ECC decoder during a retry operation prior to the head reaching the data sector recorded in the target track.

5. The disk drive as recited in claim 4, wherein the control circuitry is further operable to step the erasure window over the entire data sector prior to the head reaching the data sector recorded in the target data track.

6. The disk drive as recited in claim 1, wherein the control circuitry is further operable to:
    initialize an offset for the erasure window;
    step the erasure window starting at the offset during a first retry operation;
    adjust the offset for the erasure window after the first retry operation; and
    step the erasure window starting at the adjusted offset during a second retry operation.

7. The disk drive as recited in claim 1, wherein:
    the disk comprises a plurality of zones;
    each zone comprises a plurality of the data tracks;
    a data rate of a first zone is less than a data rate of a second zone; and
    the control circuitry adjusts the erasure window relative to the zone comprising the target data track.

8. The disk drive as recited in claim 1, wherein the control circuitry is further operable to:
    generate a disk locked clock synchronized to a data rate of the data sector recorded in the target data track; and
    generate a fixed rate clock;
    wherein:
        the first decode of the data sector with the ECC decoder uses the disk locked clock; and
        the second decode the data sector with the ECC decoder uses the fixed rate clock.

9. The disk drive as recited in claim 8, wherein a frequency of the fixed rate clock is higher than a frequency of the disk locked clock.

10. The disk drive as recited in claim 1, wherein the control circuitry is further operable to second decode the data sector while the head is passing over the non-read data sectors recorded in the target data track.

11. A method of operating a disk drive, the disk drive comprising a disk comprising a plurality of data tracks, wherein each data track comprises a plurality of data sectors, and a head actuated radially over the disk, the method comprising:
reading one of the data sectors from a target data track on the disk;
storing the data sector in a buffer;
first decoding the data sector with an error correction code (ECC) decoder;
when the first decoding fails:
adjusting an erasure window based on a number of non-read data sectors recorded in the target data track, wherein the erasure window comprises a length spanning at least one ECC symbol in the data sector;
reading the data sector from the buffer; and
second decoding the data sector with the ECC decoder using the erasure window.

12. The method as recited in claim 11, wherein when the second decoding fails further comprising:
stepping the erasure window by a step size equal to at least one ECC symbol in the data sector;
reading the data sector from the buffer; and
third decoding the data sector with the ECC decoder using the erasure window.

13. The method as recited in claim 12, wherein adjusting the erasure window comprises adjusting at least one of the length of the erasure window and the step size.

14. The method as recited in claim 12, further comprising repeatedly stepping the erasure window by the step size and decoding the data sector using the ECC decoder during a retry operation prior to the head reaching the data sector recorded in the target track.

15. The method as recited in claim 14, further comprising stepping the erasure window over the entire data sector prior to the head reaching the data sector recorded in the target data track.

16. The method as recited in claim 11, further comprising:
initializing an offset for the erasure window;
stepping the erasure window starting at the offset during a first retry operation;
adjusting the offset for the erasure window after the first retry operation; and
stepping the erasure window starting at the adjusted offset during a second retry operation.

17. The method as recited in claim 11, wherein:
the disk comprises a plurality of zones;
each zone comprises a plurality of the data tracks;
a data rate of a first zone is less than a data rate of a second zone; and
the method further comprises adjusting the erasure window relative to the zone comprising the target data track.

18. The method as recited in claim 11, further comprising:
generating a disk locked clock synchronized to a data rate of the data sector recorded in the target data track; and
generating a fixed rate clock;
wherein:
the first decoding of the data sector with the ECC decoder uses the disk locked clock; and
the second decoding of the data sector with the ECC decoder uses the fixed rate clock.

19. The method as recited in claim 18, wherein a frequency of the fixed rate clock is higher than a frequency of the disk locked clock.

20. The method as recited in claim 11, further comprising second decoding the data sector while the head is passing over the non-read data sectors recorded in the target data track.

* * * * *